Feb. 1, 1955  R. A. GREEN  2,700,870
MACHINE TO ASSEMBLE CHAIN STRUCTURES WITH PIN REMOVER
FOR PRODUCING CHAINS OF DEFINITE LENGTHS
Filed May 16, 1949  17 Sheets-Sheet 8
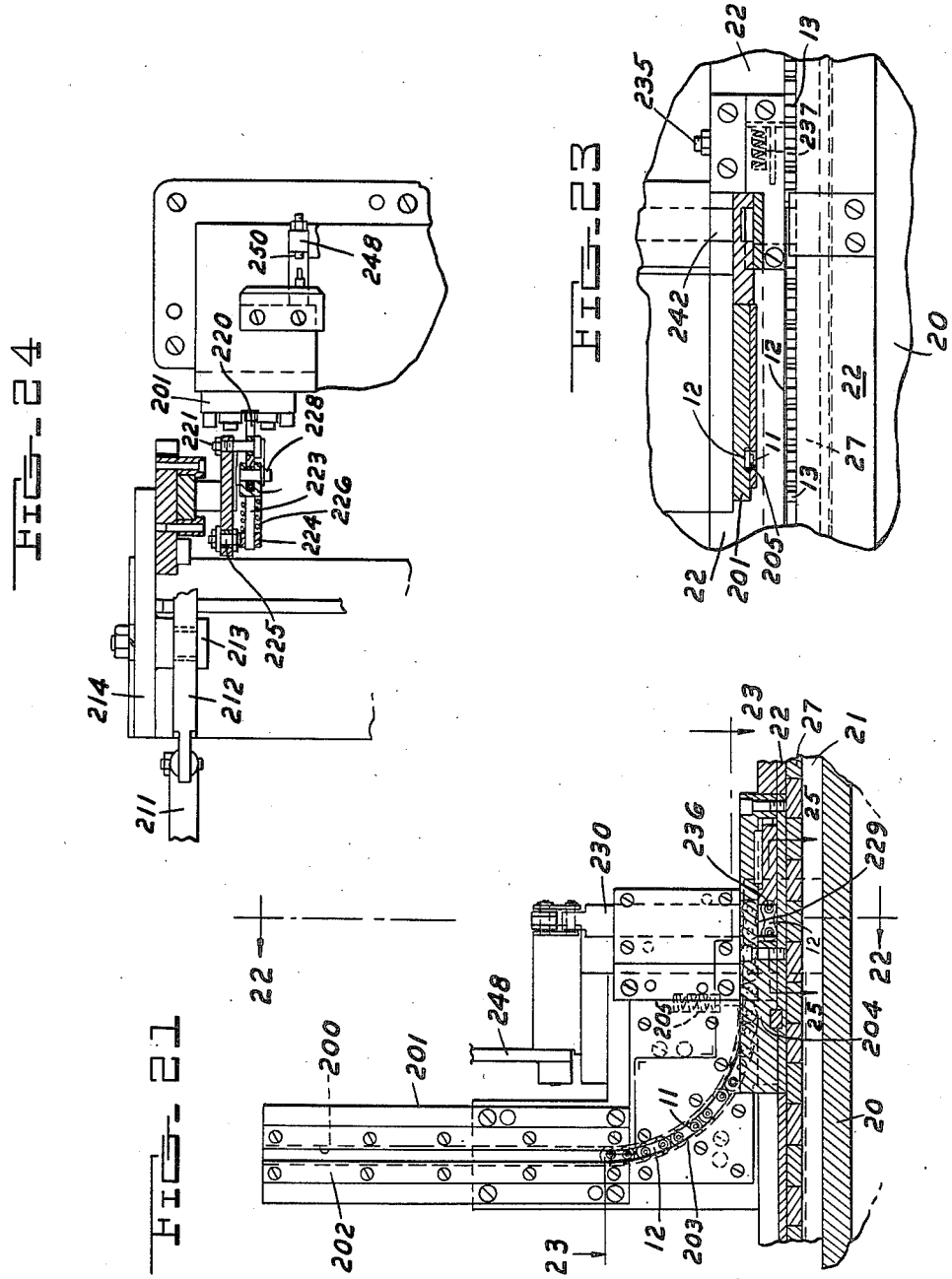
INVENTOR.
RICHARD A. GREEN
BY Whittemore,
Hulbert & Belknap
ATTORNEYS

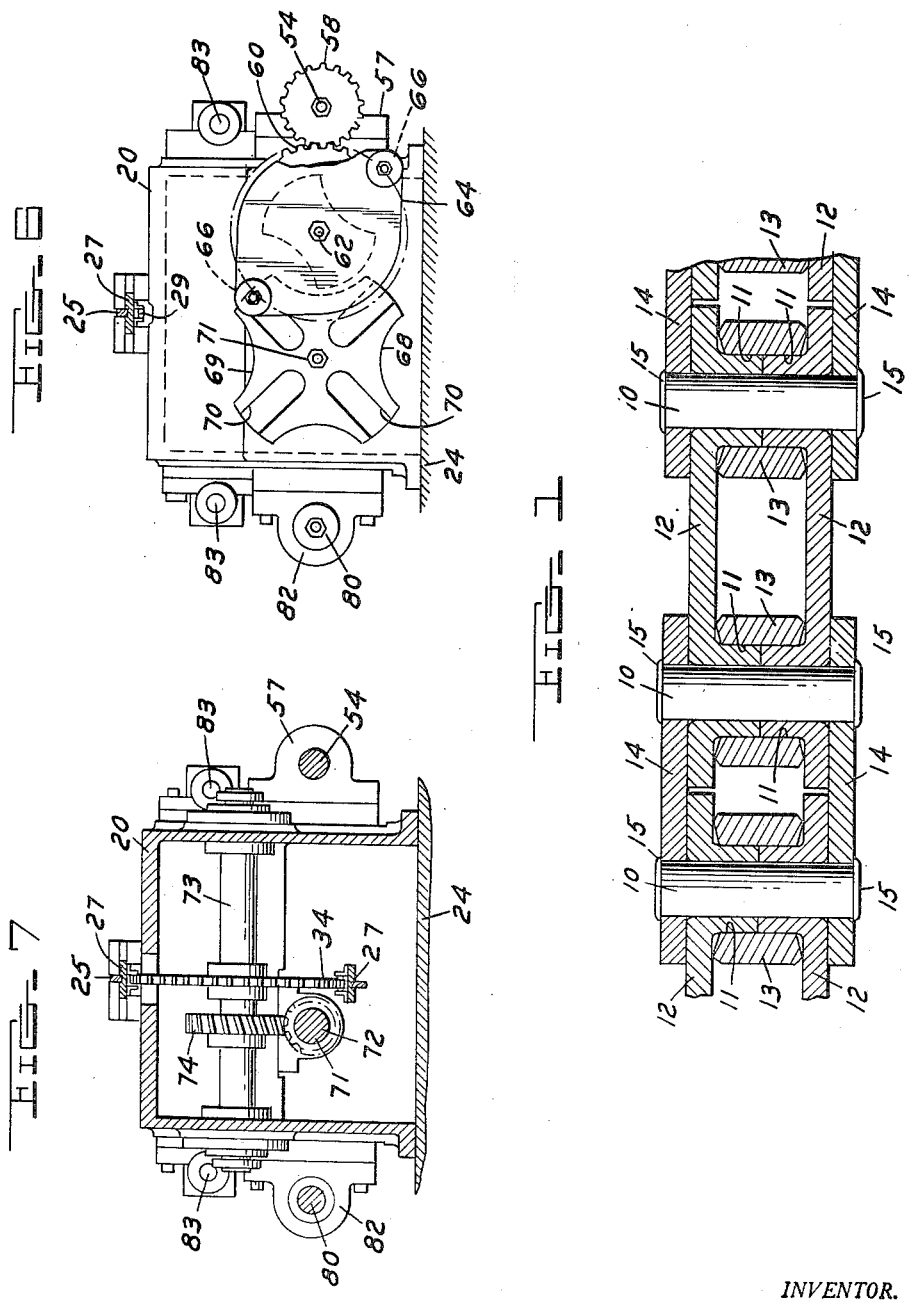

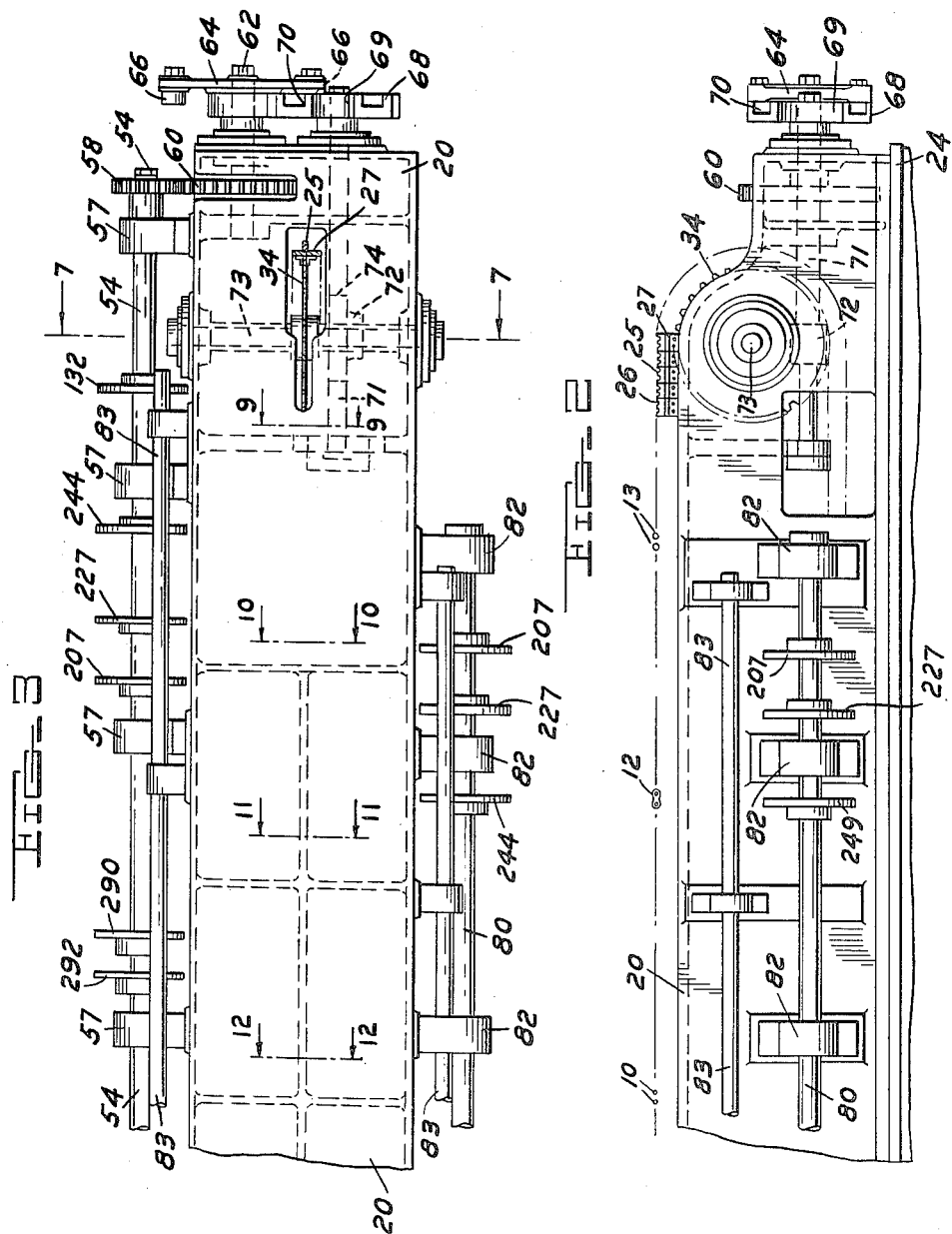

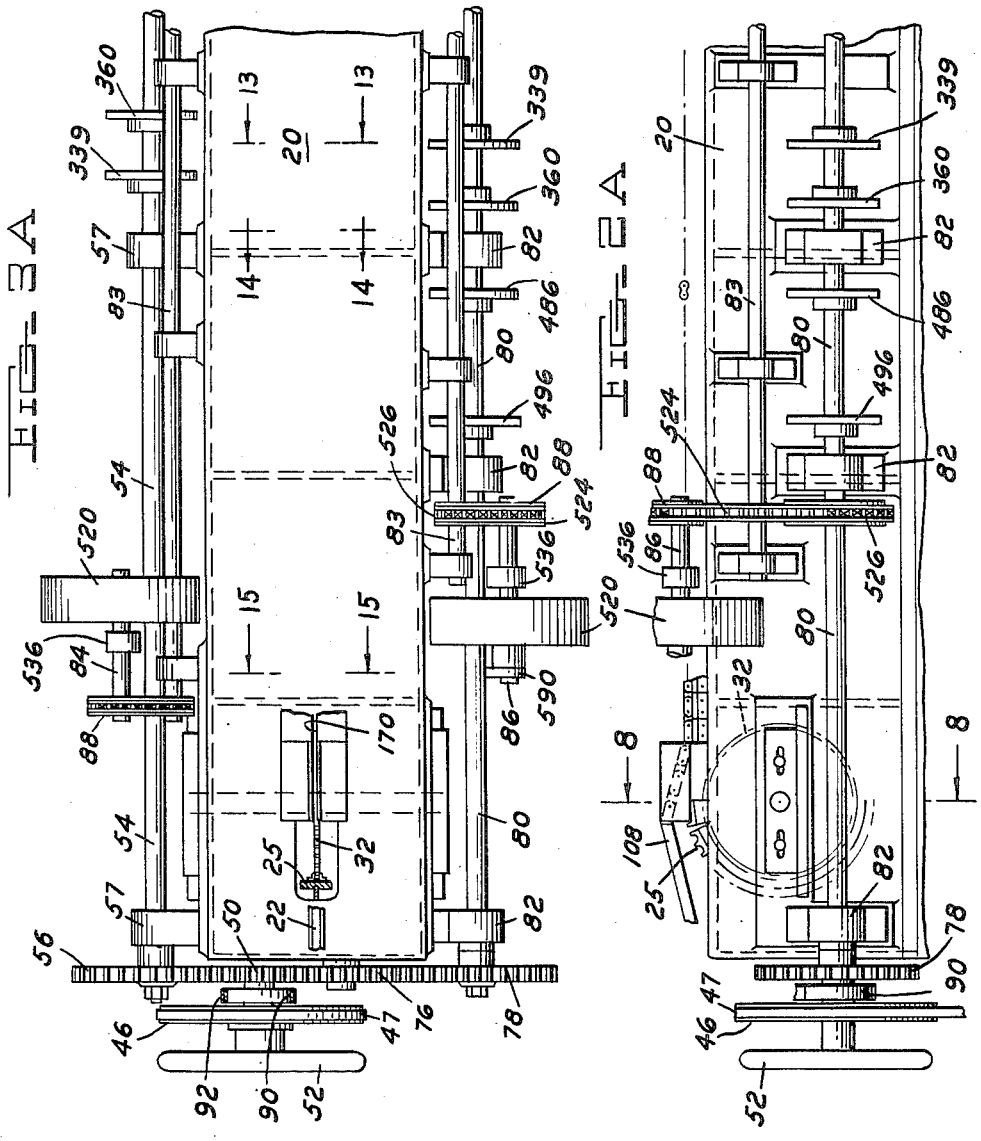

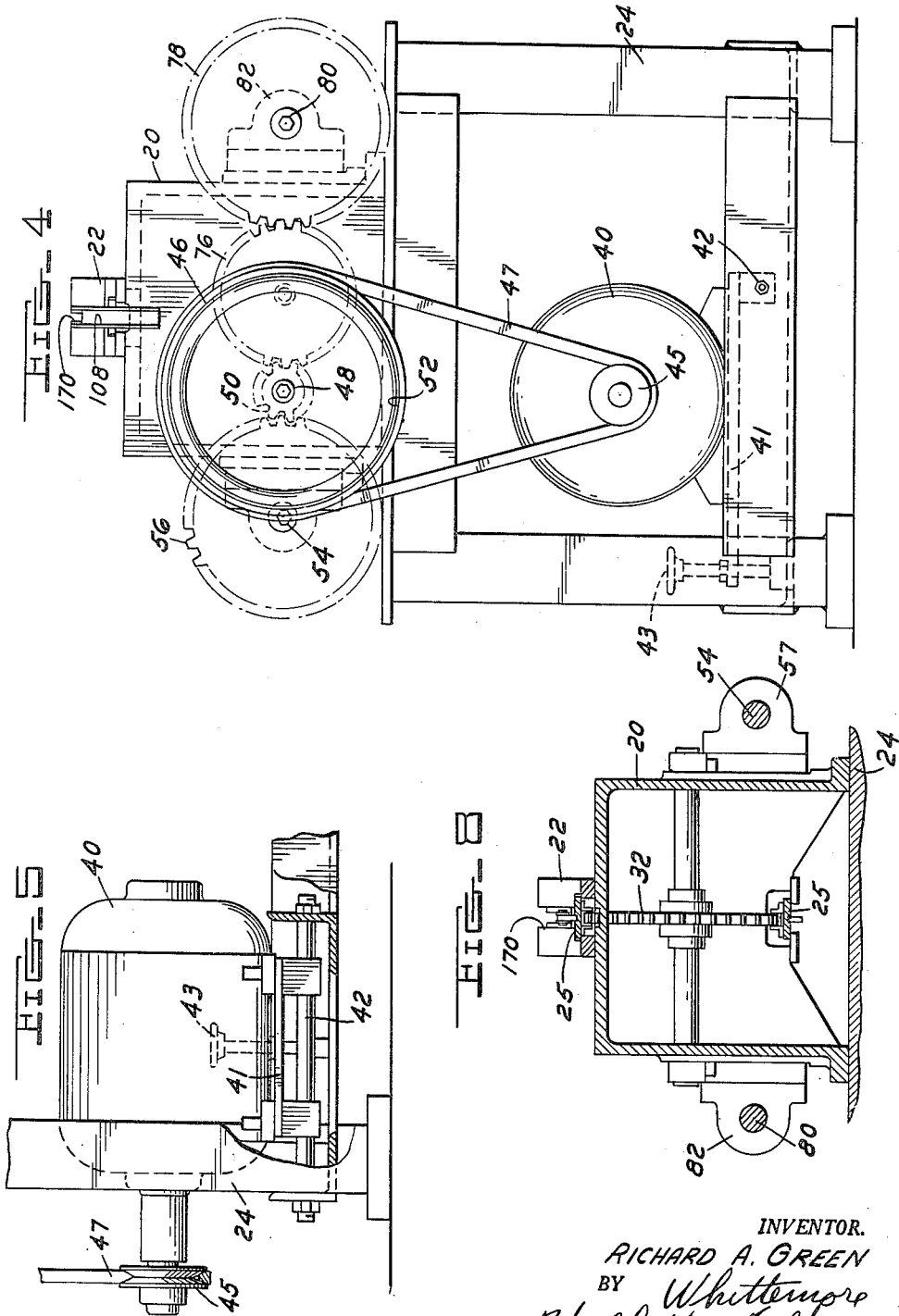

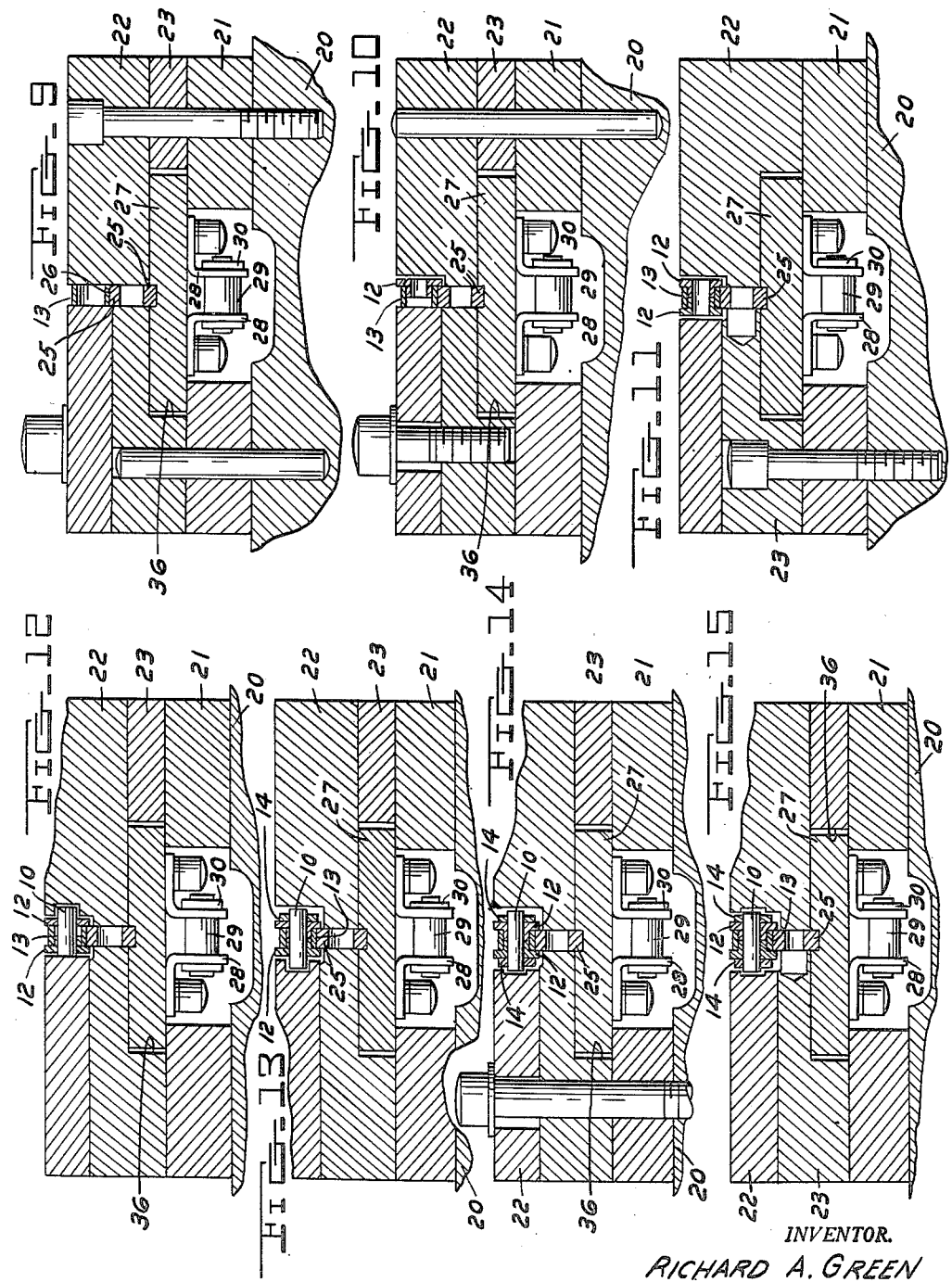

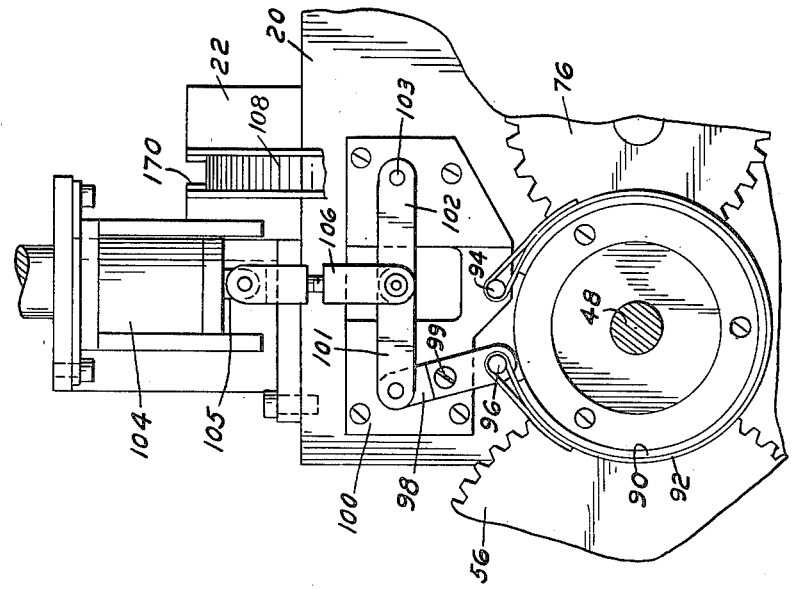

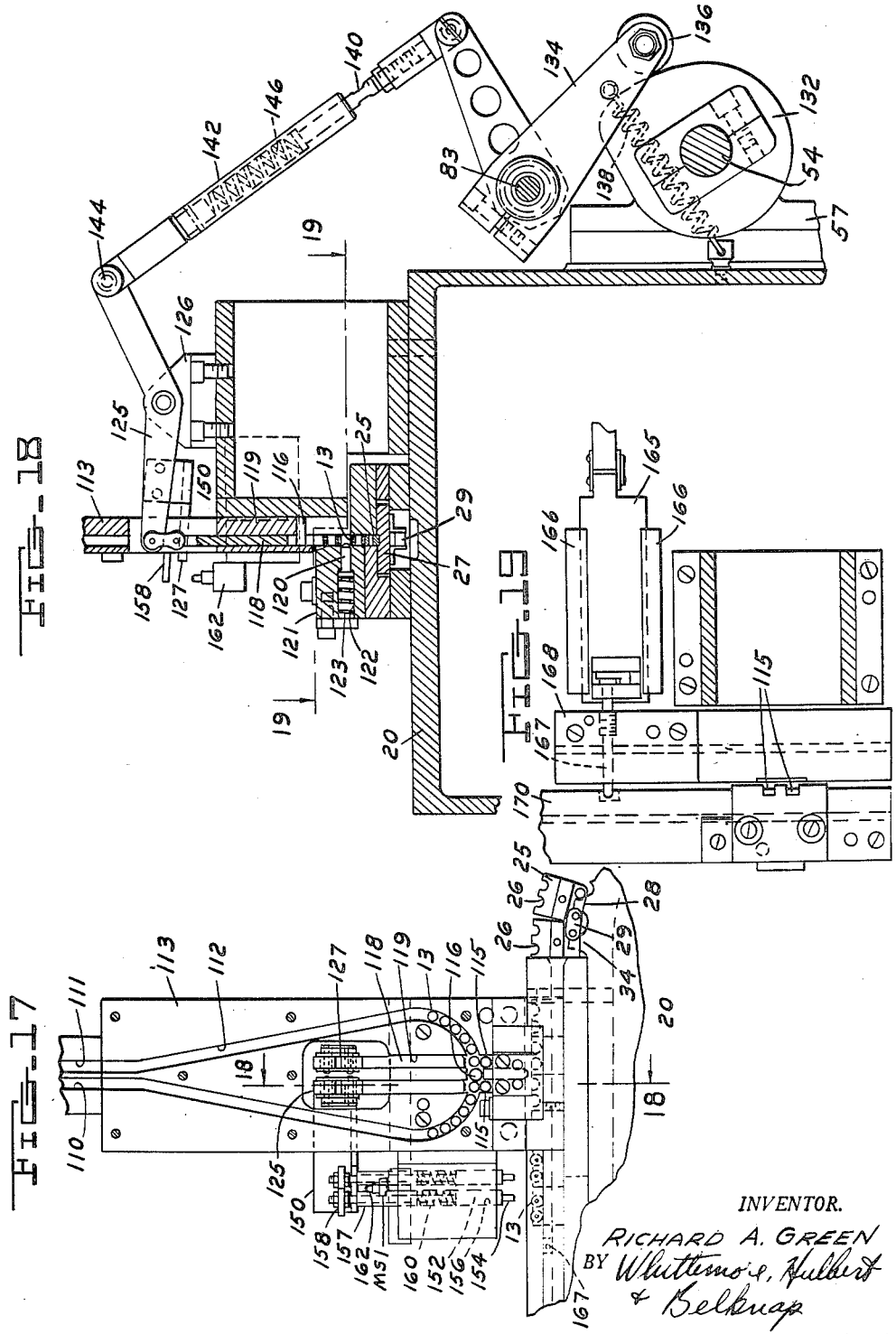

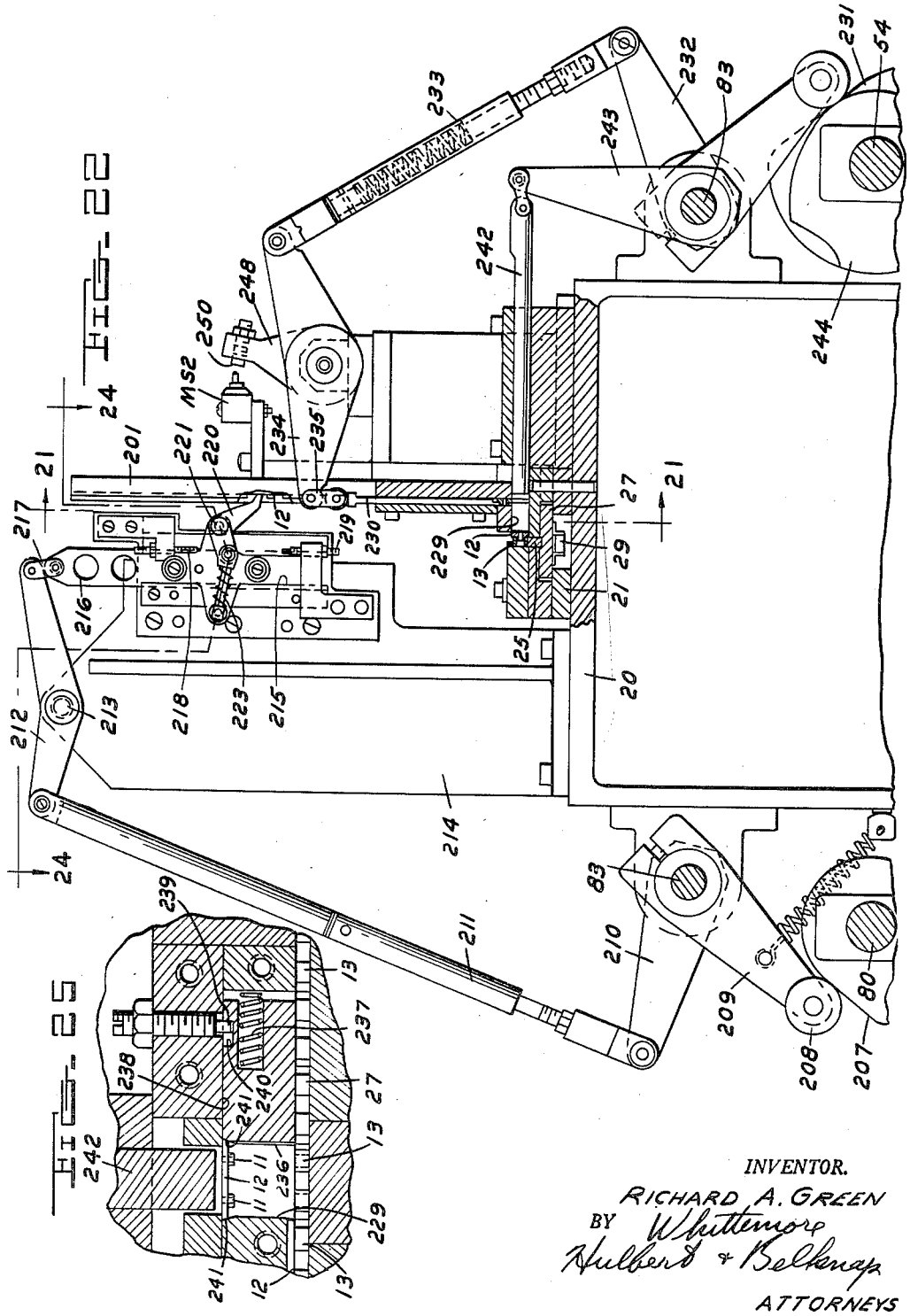

Feb. 1, 1955
R. A. GREEN
2,700,870
MACHINE TO ASSEMBLE CHAIN STRUCTURES WITH PIN REMOVER
FOR PRODUCING CHAINS OF DEFINITE LENGTHS
Filed May 16, 1949
17 Sheets-Sheet 10
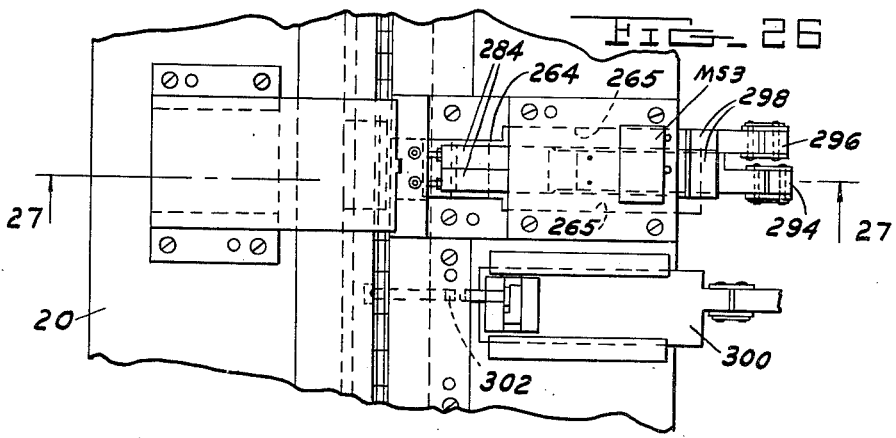
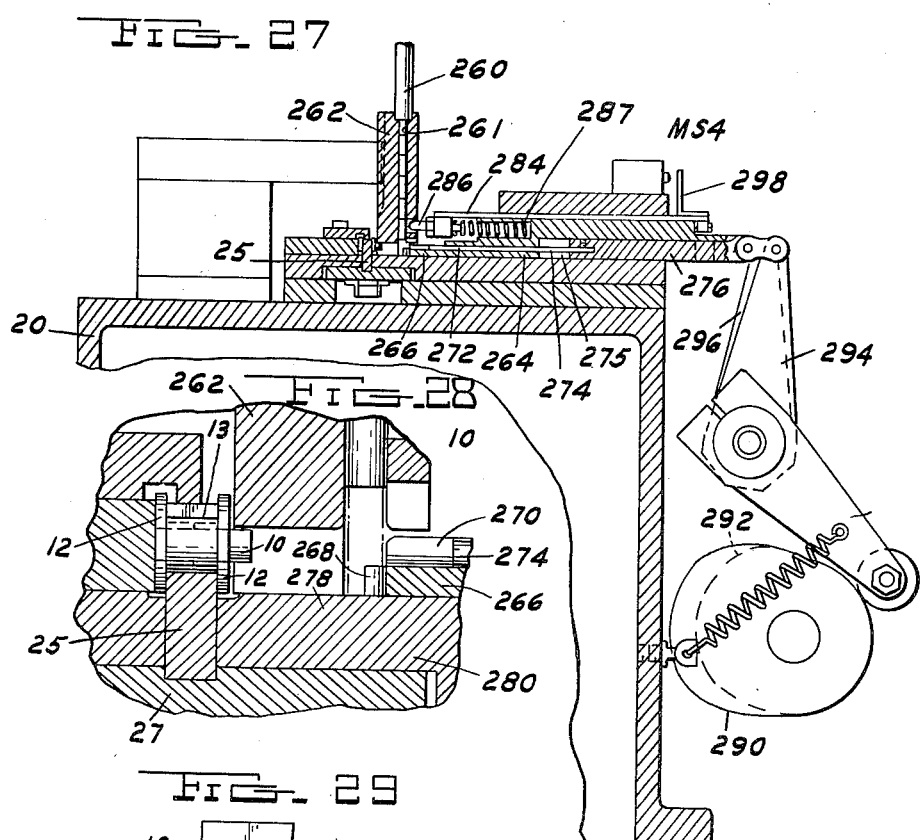
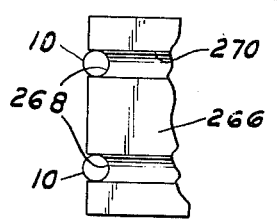
INVENTOR.
RICHARD A. GREEN
BY Whittemore
Hulbert & Belknap
ATTORNEYS

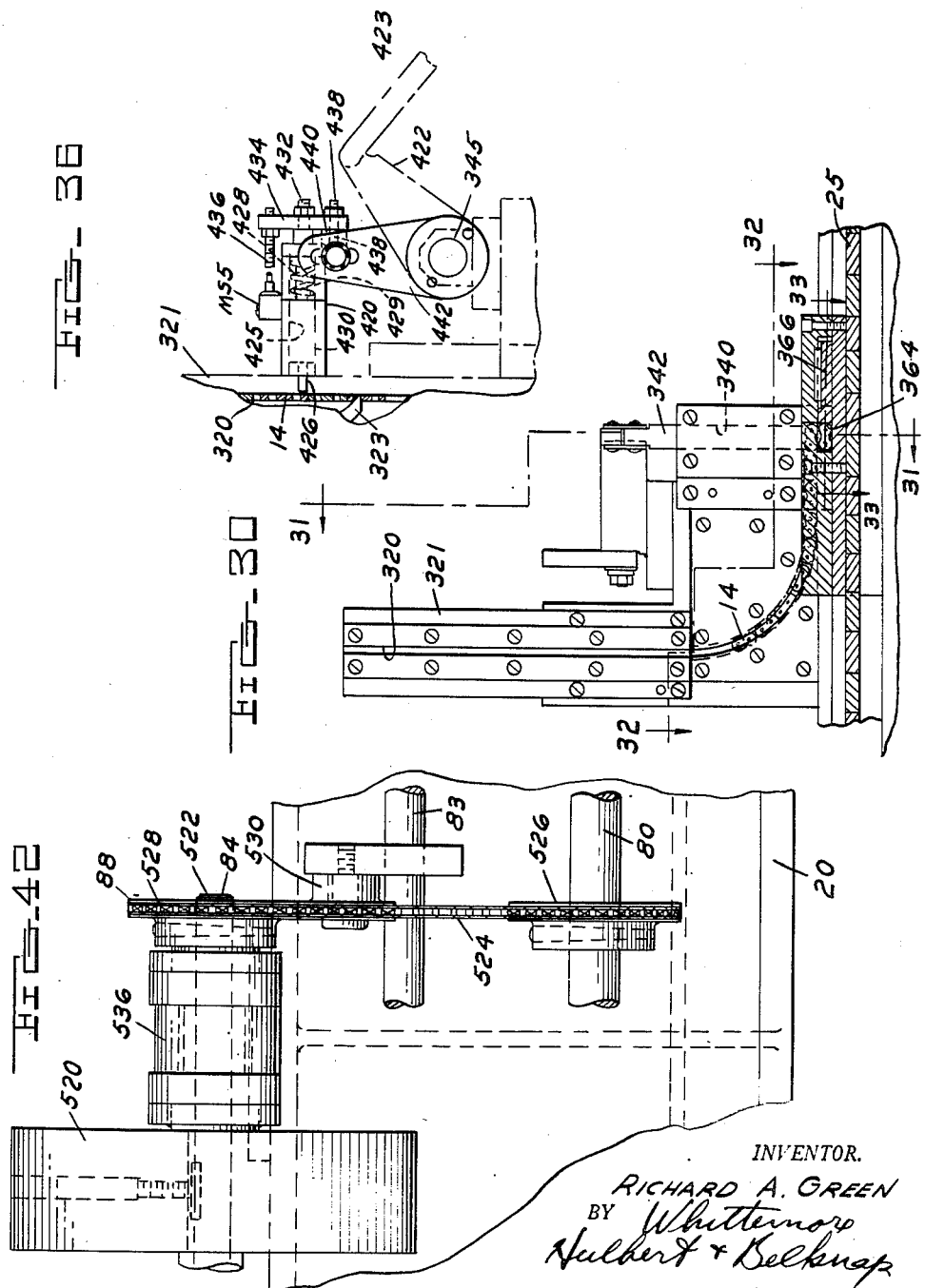

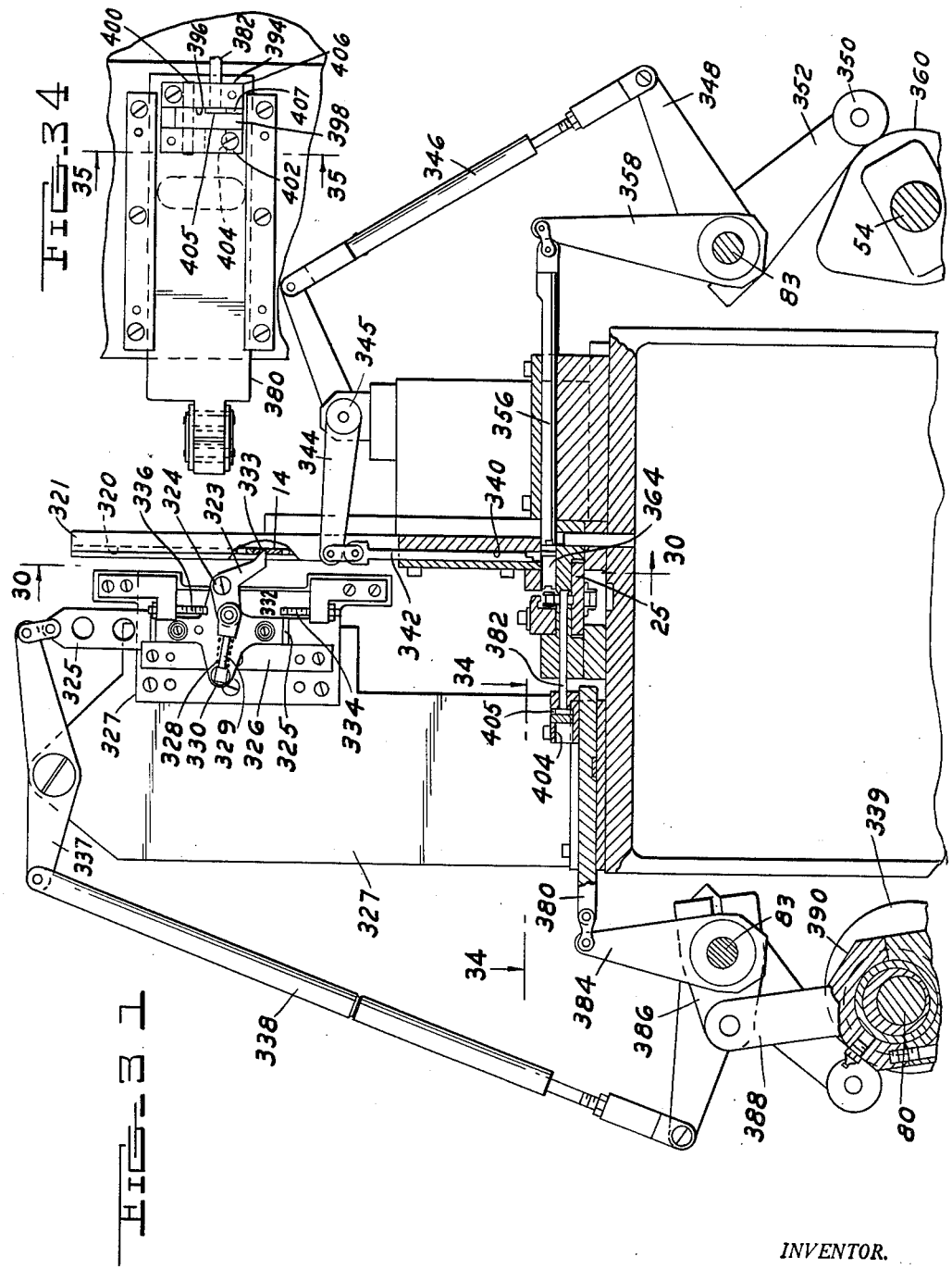

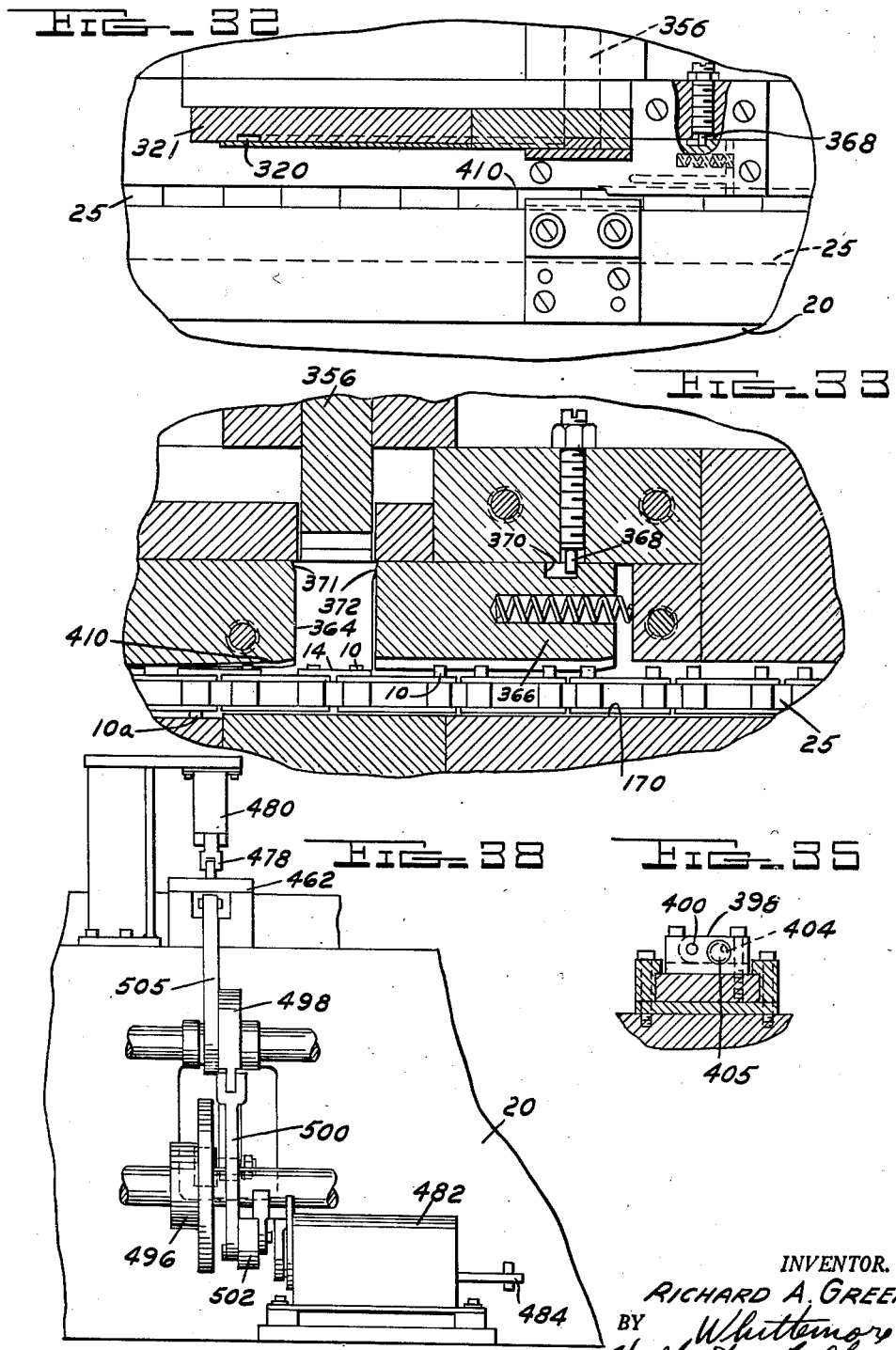

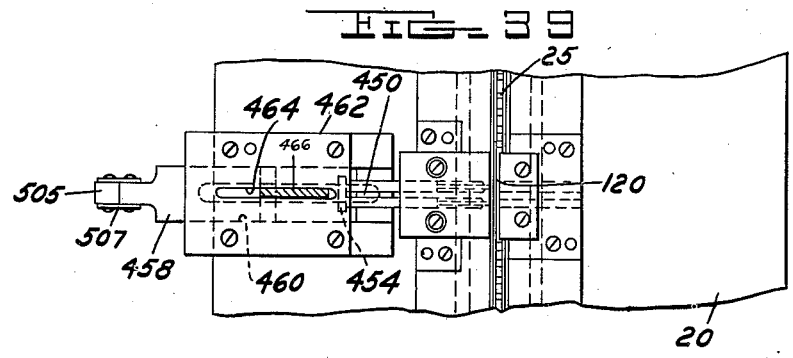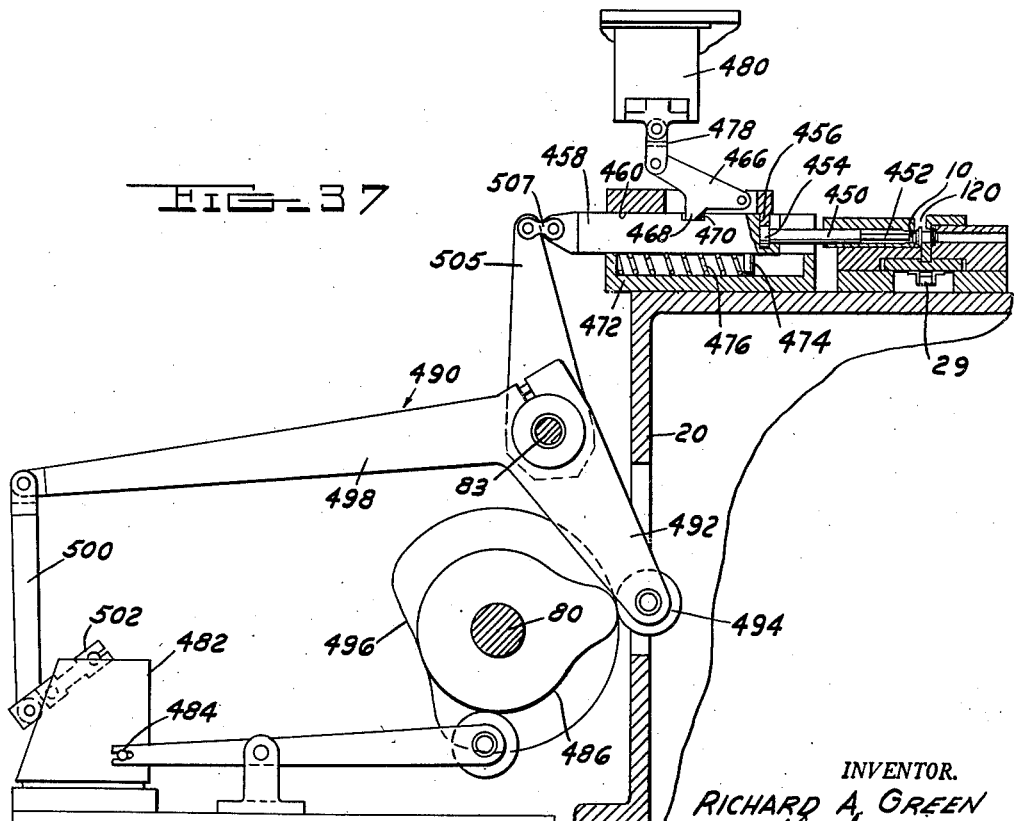

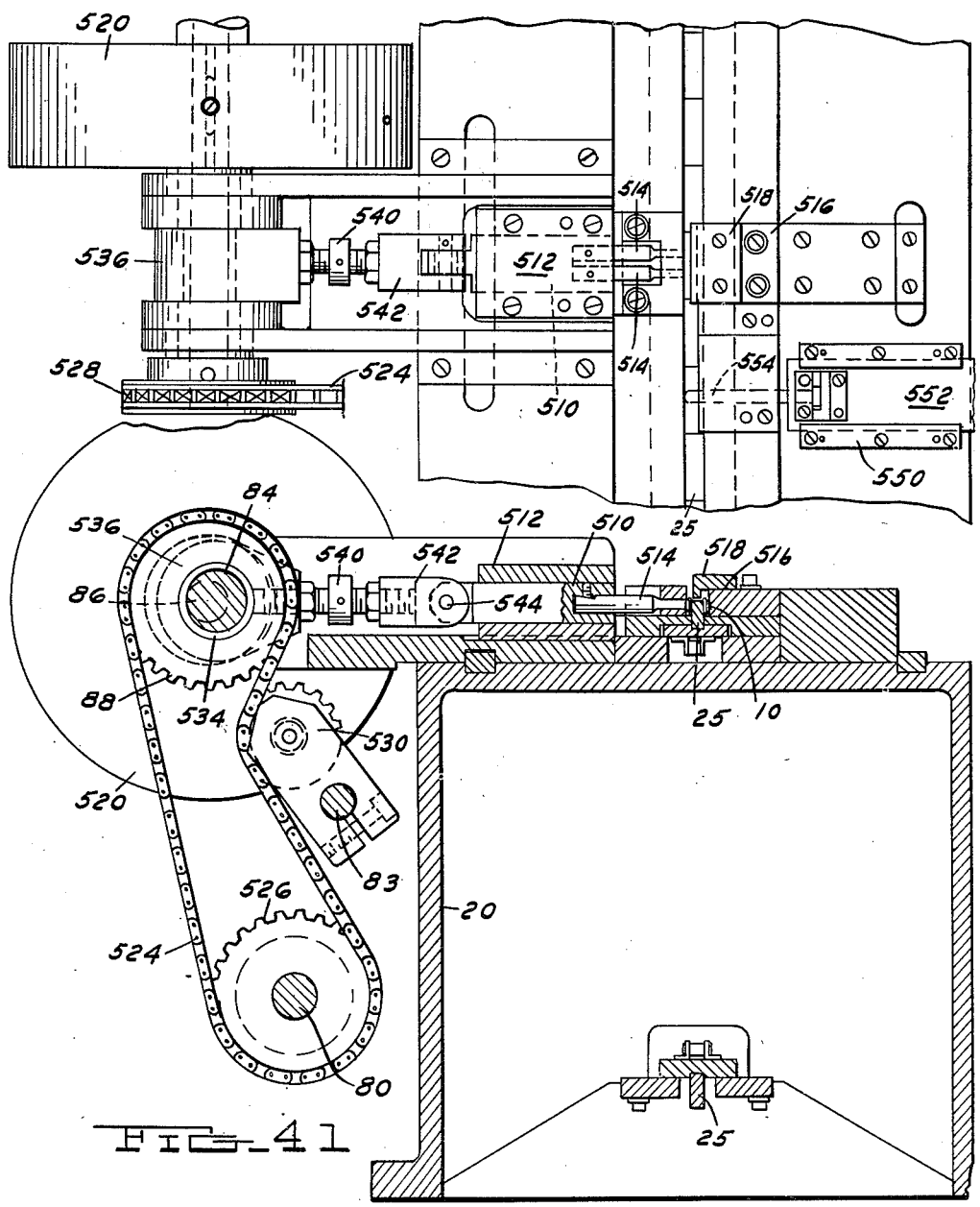

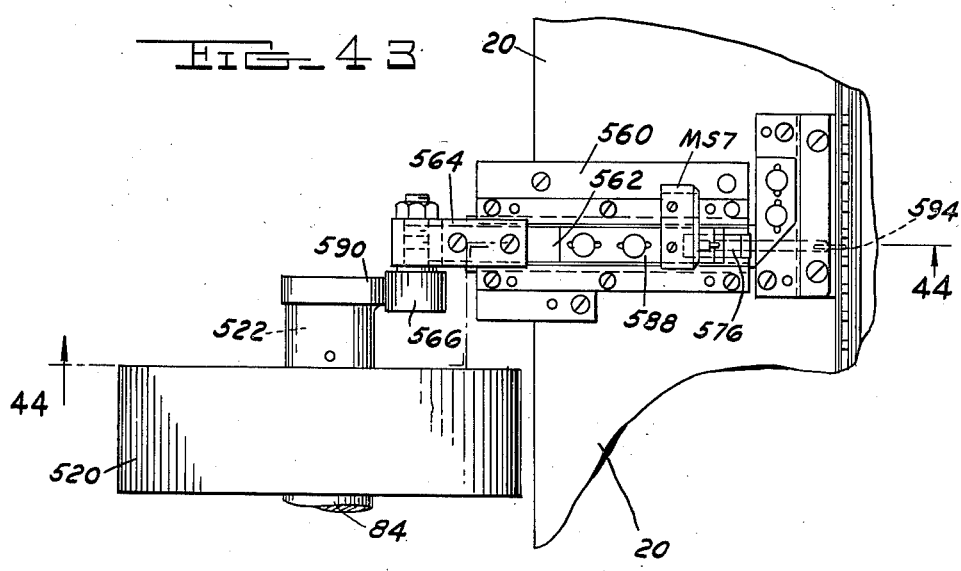
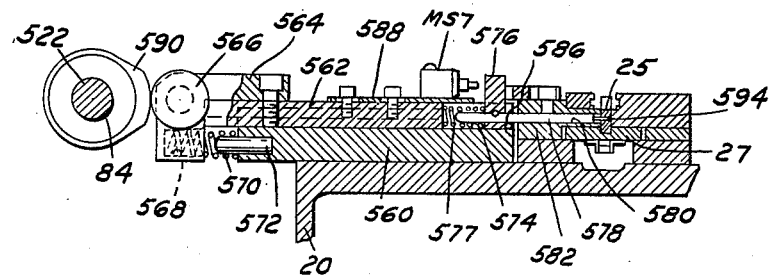

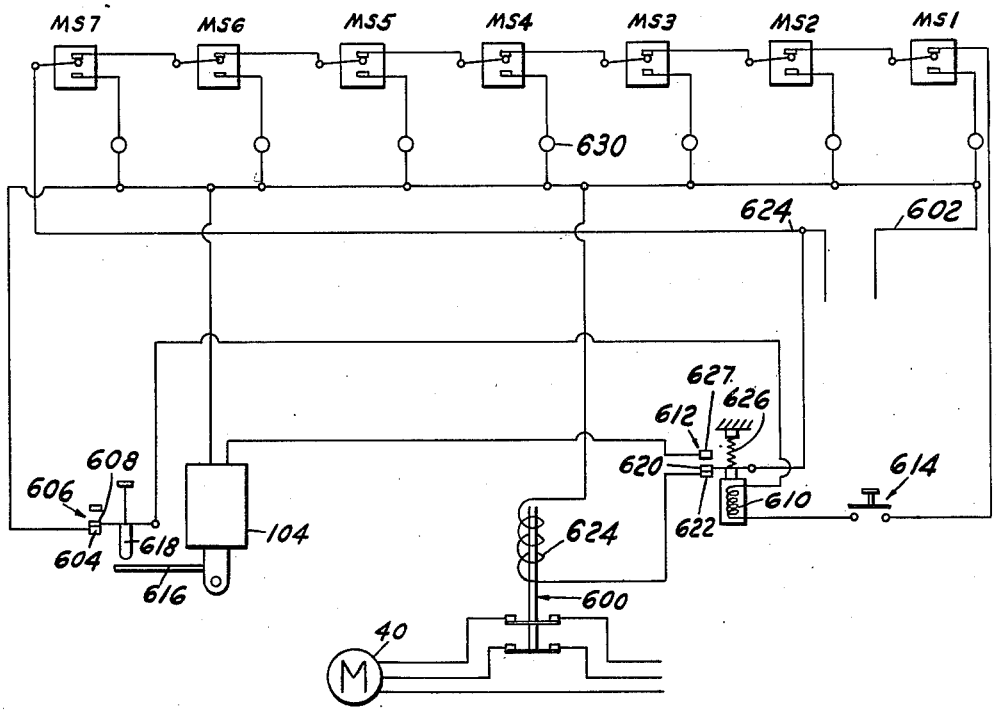

United States Patent Office 2,700,870
Patented Feb. 1, 1955

2,700,870

MACHINE TO ASSEMBLE CHAIN STRUCTURES WITH PIN REMOVER FOR PRODUCING CHAINS OF DEFINITE LENGTHS

Richard A. Green, Lincoln Park, Mich., assignor, by mesne assignments, to Mitchell Smith, Detroit, Mich.

Application May 16, 1949, Serial No. 93,558

7 Claims. (Cl. 59—7)

The present invention relates to chain assembly mechanism and more particularly to a fully automatic machine for assembling and finishing predetermined lengths of roller chain.

It is an object of the present invention to provide apparatus of the character described, characterized by its simplicity of operation, the uniformity of results obtained, and the high speed of assembly which results therefrom.

More specifically, it is an object of the present invention to provide apparatus of the character described including means for supplying chain elements continuously to several operating stations at which the elements are automatically assembled into the completed chain.

It is a feature of the present invention to provide a machine characterized by the use of a plurality of carrier blocks into which certain chain elements are automatically fed, the carrier blocks being thereafter advanced in a step-by-step manner and the additional chain elements being automatically advanced into cooperating position with those elements previously assembled.

It is a feature of the present invention to provide apparatus of the character described comprising an elongated frame having a channel or track-way along which a series of recessed carrier blocks are intermittently advanced, and interconnected camming and timing rods at opposite sides of the machine, cam actuated mechanism carried by the machine for effecting the sequential assembly of chain elements in a particular manner followed by a staking or riveting operation of the chain pins at the last station.

Other objects and features of the invention will become apparent as the description proceeds, especially when taken in conjunction with the accompanying drawings, wherein:

Figure 1 is a longitudinal section through a portion of chain constructed by the apparatus disclosed herein.

Figures 2 and 2A together constitute a side elevation of the apparatus.

Figures 3 and 3A together constitute a plan view of the apparatus shown in Figures 2 and 2A with parts broken away.

Figure 4 is an end view of the apparatus looking from the finishing end.

Figure 5 is a side elevation of the motor drive assembly.

Figure 6 is an end view of the apparatus looking from the starting end.

Figure 7 is a section on the line 7—7, Figure 3.

Figure 8 is a section on the line 8—8, Figure 2A.

Figures 9–15 are transverse sections through the rail structure at the section lines designated 9—9 to 15—15, Figure 3.

Figure 16 is an elevational view illustrating the solenoid actuated brake mechanism.

Figure 17 is a side elevational view of the mechanism at station #1.

Figure 18 is a transverse vertical section at station #1.

Figure 19 is a fragmentary section on the line 19—19, Figure 18.

Figure 20 is a side elevational view of the cam actuated mechanism.

Figure 21 is a fragmentary side elevation partly in section of the mechanism at station #2.

Figure 22 is a transverse vertical section at station #2.

Figure 23 is a fragmentary section on the line 23—23, Figure 21.

Figure 24 is a fragmentary section on the line 24—24, Figure 22.

Figure 25 is an enlarged sectional view on the line 25—25, Figure 21.

Figure 26 is a plan view of the mechanism at station #4.

Figure 27 is a transverse vertical section on the line 27—27, Figure 26.

Figure 28 is an enlarged sectional view illustrating a detail of the structure shown in Figure 27.

Figure 29 is an enlarged fragmentary plan view of the mechanism for receiving and advancing the pins.

Figure 30 is a side elevation, partly in section, of the mechanism at station #5.

Figure 31 is a vertical transverse section through the machine at station #5, taken on the line 31—31, Figure 30.

Figure 32 is a fragmentary section on the line 32—32, Figure 30.

Figure 33 is an enlarged horizontal section illustrating the manner of advancing the plates into the assembly, and taken on the line 33—33, Figure 30.

Figure 34 is a fragmentary plan view at the line 34—34, Figure 31.

Figure 35 is a fragmentary sectional view on the line 35—35, Figure 34.

Figure 36 is a partly diagrammatic vertical elevation with parts in section, illustrating mechanism for sensing interruption of the supply of parts at stations #5 and #6.

Figure 37 is a transverse vertical sectional view through the machine at station #7.

Figure 38 is a side elevation of the machine at station #7.

Figure 39 is a plan view of the mechanism at station #7.

Figure 40 is a plan view of the mechanism at station #8.

Figure 41 is a transverse vertical section of the mechanism at station #8.

Figure 42 is a fragmentary side elevation of the mechanism at station #8.

Figure 43 is a fragmentary plan view of the mechanism at station #8 for sensing improper indexing of carrier blocks.

Figure 44 is a section on the line 44—44, Figure 43.

Figure 45 is a simplified wiring diagram.

The chain

Before proceeding to a description of the mechanism for effecting automatic assembly of the chain, a brief description of the chain itself will be given to facilitate the understanding of the mechanism.

The sprocket chain comprises links made up of pins 10 extending through inturned collars 11 in inside plates 12, the ends of the collars abutting as illustrated and being surrounded by a generally cylindrical tubular roll 13. Adjacent pairs of links are assembled by pairs of outside plates 14 which are retained in position on the pins 10 by staking or the like as indicated at 15.

This chain is disclosed and claimed in the prior application of Donald J. McIntosh and Mitchell Smith, Serial No. 793,736, filed December 24, 1947, which application is assigned to the assignee herein.

In the production of this chain in a rapid continuous manner by fully automatic mechanism, a chain support is intermittently advanced, and the parts of the chain are automatically fed into position and assembled together. Briefly described, the tubular rolls 13 are first fed into position in appropriately spaced recesses on the assembly support. Thereafter, the pair of inside plates is assembled within the roller. The next operation is the insertion of the pins 10 into the collars of the inside plates 12. Thereafter, the outside plates 14 are advanced into position and assembled over the projecting ends of the pins 10. Finally, the ends of the pins are staked or riveted as indicated in the figure, thus completing the assembly of the chain. As the chain support advances, two of the pins 10 are removed from the chain at predetermined intervals, thus separating the chain in predetermined lengths. The chain is advanced off the end of the machine and is received within a suitable receptacle.

The assembly is fully automatic and requires only that supply hoppers which feed the parts to the proper stations in the machine, shall be kept filled. Suitable sensitive mechanism is associated with the machine to sense defective parts, omission of parts, errors in spacing of support mechanism, and similar conditions which might result in unsatisfactory chain or injury to the machine. Such means is arranged to interrupt operation of the machine with substantially no time delay.

General organization

The machine for assembling the chain, as best seen in Figures 2 and 3, comprises a frame 20, the central longitudinal portion of which is made up of three co-operating rails, a bottom rail being designated 21, a top rail 22, and the middle rail being designated 23. These rails are shown in the sections of Figures 9–15. This structure may conveniently be mounted on a table 24.

Means are provided for receiving the chain elements and advancing the same in a step-by-step manner longitudinally of the machine. This means comprises a plurality of carrier blocks 25, each of which has provided in its upper surface a pair of transverse recesses 26 for receiving tubular rolls. Blocks 25 as best seen in Figure 9, are each secured to a supporting plate 27 which at its underside is provided with a pair of ears 28 between which extends a roller 29 and adjacent pairs of ears are interconnected by links 30, thus in effect causing the chain supporting and assembly structure to itself be in the form of a sprocket chain. A pair of sprockets 32 and 34 are provided, one at each end of the machine, and the chain-like assembly and supporting structure are driven thereby. As best seen in Figure 9, the upper run of the supporting and assembly structure is supported on the upper surface of the bottom plate 21 and is retained in the position in a suitable recess 36.

The mechanism for advancing the continuous series of carrier blocks comprises a motor 40 mounted on a plate 41, which is pivoted as indicated at 42 to the table 24, the plate being adjustable by virtue of a threaded adjusting bolt indicated at 43. The motor 40 has a driving shaft 45 which is adapted to drive a pulley 46 mounted on the frame 20 through the medium of a V-belt or the like indicated at 47. The pulley 46 is mounted on a stub shaft 48 which also carries a pinion 50. In addition to the pinion 50 the shaft 48 has secured thereto a hand wheel 52 so that the driving mechanism may be manually moved and adjusted.

Extending along one side of the frame 20 is a timing and actuating cam shaft 54 which is driven from the pinion 50 through the medium of a driving gear 56. The shaft 54 is supported in suitable bearings 57 at intermediate points and at its opposite end carries a pinion 58. The table and frame assembly is divided into a plurality of stations, nine in number, and at each station there is provided one or more actuating cams secured to the shaft 54, or to a synchronously driven shaft at the other side of the machine, which will be described later. These cams will be described subsequently in connection with the description of the mechanism at each of the separate operating stations.

At the end of the machine opposite to the motor, mechanism is provided for effecting intermittent step-by-step advance of the carrier block assembly. This mechanism as seen in Figures 3 and 6, comprises a gear 60 mounted on a stub shaft 62 which at its outer end carries a plate 64 having a pair of rollers 66 thereon. Adjacent the plate 64 and the rollers 66 is a second plate 68 having arcuate peripheral recesses 69 and radially extending slots 70, these parts cooperating with the rollers 66 to form a conventional Geneva mechanism for effecting intermittent rotation of the plate 68. The plate 68 is keyed or otherwise secured to a shaft 71 which is provided with a worm 72. A cross shaft 73 is provided in the frame carrying a worm wheel 74 and keyed or otherwise secured to the cross shaft 73 is the driving sprocket 34. In practice, the gear 60 has twice as many teeth as the gear 58 and the worm 72 is a four-start worm and the worm gear 74 has thirty-two teeth. There is accordingly one-quarter of a revolution of the worm 72 for each rotation of the shaft 54, and the driving parts are constructed and arranged to advance the carrier blocks 25 a distance equal to the spacing between alternate chain rollers 13 during each incremental advance.

At the motor end of the machine, as best seen in Figure 4, there is provided an idle gear 76 meshing with a second gear 78 keyed or otherwise secured to a second timing and cam shaft 80, which extends along the opposite side of the machine from the shaft 54. The shafts 54 and 80 are thus rotated at the same speed. The shaft 80 is provided with a plurality of bearings 82 and is further provided with a plurality of cams for effecting desired operations at the several operating stations as will subsequently appear. At each side of the machine and spaced somewhat above the rotating shafts 54 and 80, are stationary shafts 83 upon which are mounted a plurality of levers designed to be actuated by the cams as will appear in the subsequent detailed description of the several operating stations.

Also carried by the frame 20 adjacent stations #8 and #9, are shafts 84 and 86, each of which is provided with a sprocket 88 adapted to be driven from a corresponding sprocket on the adjacent shafts 54 and 80 respectively. These shafts 84 and 86 actuate mechanism for staking the pins as will subsequently appear.

It will be appreciated that the sections illustrated in Figures 9–15 are taken intermediate the operating stations.

Referring now to Figures 9–15 it will be observed that the composite top rail 22 defines a longitudinally extending channel for the reception of the carrier blocks 25 and the chain elements which have been assembled therein. As seen in Figure 9, the channel is of a transverse section such that it receives and closely engages the rollers 13 which have been inserted at station #1.

In Figure 10 one of the inside plates 12 has been inserted and the channel in the top rail is shaped to accommodate this member. In Figure 11 the shape of the channel in the top rail has been changed to accommodate the second inside plate 12.

In Figure 12 the pins 10 have been inserted and the channel in the top rail is shaped to accommodate these pins with the pins projecting completely from one side of the assembly thus far completed. In Figure 13, the first outside plate 14 has been added to the assembly and the pins have been shifted to a substantially central position.

In Figure 14 the second outside plate 14 has been added and the pins 10 shifted to substantially central position. In Figure 15 the channel is shaped to receive the completely assembled chain and the remaining operations required to complete the chain are the staking of the opposite ends of the pins.

Means are provided for sensing the presence of and proper location of parts, and in the event that parts are not properly located so that a subsequent operation might cause damage to the product or to the machine, the drive for the motor 40 is instantaneously interrupted. In order to overcome inertia of the parts and to bring the machine to susbtantially instantaneous rest a brake illustrated in Figure 16 is provided. This brake comprises a brake drum 90 secured to the shaft 48 and having a flexible brake band 92 associated therewith. One end of the brake band is anchored to a stationary pin 94 and the other end is secured to a pin 96 carried by a lever 98. The lever is pivoted intermediate its ends as indicated at 99 to a bracket 100, and at its opposite end is connected to a link 101 which cooperates with a second link 102 pivoted at its end as indicated at 103 to the bracket. A solenoid 104 is provided having a plunger 105 connected to a link 106, which at its outer end is pivoted to inner ends of the links 101 and 102. This construction provides a toggle mechanism for applying the brake when the solenoid 104 is energized, thus bringing the motor and associated moving parts to substantially instantaneous rest. The solenoid 104 is connected to a control circuit so that it will be energized and the motor 40 deenergized immediately upon sensing of dangerous conditions in the operation of the machine.

At the discharge end of the machine an unloading ramp 108 is provided which elevates the completed chain out of the carrier blocks. As each completed section of chain reaches the ramp 108, it slides off into a suitable receptacle which is provided at the lower end of the ramp.

Station #1

At station #1, illustrated in Figures 17–19, a pair of tubular rollers 13 is inserted in the upwardly opening recesses 26 provided in each of the carrier blocks 25. Hoppers (not shown) are provided in which a supply of rollers is received and these are fed downwardly through a pair of passages 110 and 111. These passages communicate with continuing passages 112 provided in a plate 113, which is illustrated in Figure 17 with a cover plate removed to show the passages 112 in full lines. Passages 112 diverge downwardly and outwardly in the plate 113 and then approach and communicate with short vertically extending passages 115 at the lower end of the plate 113. Communication at this point between the lower ends of the passages 112 is blocked by a transverse pin 116. In order to feed the rolls downwardly in pairs, plungers 118 are provided which are slidable in vertical channels 119 which form extensions above and in alignment with the feed passages 115. In order to prevent downward movement of the rollers into engagement with the carrier blocks 25, except when it is desired to position a pair of rolls in a carrier block, plungers 120 are provided in a block 121 having recesses 122 therein for the reception of coil springs 123 biasing the plungers 120 into engagement with a pair of rollers 13 as best seen in Figure 18.

Actuating means for moving the plungers 118 downwardly comprises a pair of levers 125, each of which is pivoted to a bracket 126 intermediate its ends and which is connected to one of the feed plungers 118 by a link 127.

The shaft 54 has a cam 132 secured thereto. The adjacent shaft 83 has mounted thereon a bell crank lever 134 carrying a cam following roller 136 on one of its arms which is retained in engagement with the cam 132 by suitable means such for example as a tension spring 138. The other arm of the bell crank 134 has pivotally secured thereto a plunger 140, which is slidably received within a sleeve 142, the opposite end of which is pivoted to the lever 125 as indicated at 144. Located in a recess in the sleeve 142 is a compression spring 146 engaged by the head of the plunger 140. Upon rotation of the cam so that the roller 136 is rotated in a counterclockwise direction as seen in Figure 18, forces are established tending to cause the plungers 118 to move downwardly to feed two of the rollers 13 into the appropriate positions in the carrier block 25. The spring 146 results in this actuation being yieldable as will be readily apparent.

Secured to the lever 125 is an angle iron 150 (Figure 17) which carries means for sensing the presence of rollers 13 in blocks 25 after they have left station #1. This mechanism comprises a pair of pins 152 having ends 154 adapted to engage rollers 13. Pins 152 extend upwardly through passages 156 which also receive slidable sleeves 157 extending upwardly therefrom. Each of the pins at its upper end carries a separate actuating plate 158. Compression springs 160 are provided between an enlarged lower portion of the pins 152 and the sleeves 157. The angle iron 150 engages the upper ends of the sleeves and moves these downwardly. Compression springs 160 also cause the pins 152 to move downwardly a corresponding amount until these pins strike the rollers 13. In the event that one of the rollers 13 is absent from the carrier block recess directly below one of the pins 152, that pin will continue to move downwardly and the actuating plate 158 carried thereby will engage the upper end of a pin 162, connected to a microswitch MS1.

Referring now to Figure 19, means are provided for insuring that the carrier block 25, which is to receive the rollers 13, is in proper position therebeneath. This mechanism is partially illustrated in Figure 19. The mechanism comprises a slide 165 mounted in accurately located guide ways indicated at 166 and provided at its forward end with a locating pin 167, adapted to be accurately guided in sliding relation by an appropriate opening through one of the bars 168 of the top rail. The locating pin 167 is adapted to move transversely of the channel 170 and to enter a corresponding transverse opening through a carrier block 25 which is spaced from the carrier block directly beneath the plunger 118.

It may be mentioned at this time that the several carrier blocks are slightly movable relative to each other longitudinally of the channel 170. It is found that the accurate registration between each individual channel block and the mechanism associated with each operating station is best achieved by effecting definite location of the carrier block at the station or one immediately adjacent thereto by means of locating pins such as that illustrated at 167 in Figure 19.

The actuating means for the slide 165 is a lever associated with bell crank 134. This machine is not illustrated in connection with station #1 but is in all respects similar to a corresponding locating pin actuating lever which is illustrated and described in connection with station #6.

It will of course be appreciated that the cam 132 is so arranged with respect to the sprocket driving mechanism that the carrier blocks which are to receive the rollers, are positioned directly beneath the passages 115 and are brought to rest prior to downward movement of the rollers as effected by the plungers 118.

As the pungers 118 force the rollers 13, which are engaged by the stop pins 120, downwardly, they at the same time advance a second pair of rollers into position in substantial alignment with the stop pins 120. These rollers are retained against further downward movement by the stop pins 120 until the next pair of carrier blocks has been advanced to receive the rollers.

*Stations #2 and #3*

Referring now to Figures 21–25, there is illustrated the mechanism for applying the inside plates 12 to the carrier blocks 25. At station #2 one of the inside plates it applied and at station #3 the other inside plate is applied. Since the mechanism is substantially identical except for reversal of its location, only one of these mechanisms will be described in detail.

The inside plates 12 are flat elongated plates having openings in either end surrounded by short collars 11, which in the assembled chain are adapted to abut each other and to form journals for the rollers 13.

A supply of the plates is provided in an elevated hopper (not shown) from which the plates feed downwardly through a chute into a guide way 200 formed in a block 201, the guide way being partially closed by a pair of overlapping plates 202. At its lower end the guide way is provided with a curved right angular bend as indicated at 203 and terminates in a horizontal portion 204. In order to prevent advance of the plates except when specifically caused by feeding mechanism, a spring loaded restrictor plate 205 is provided having a nose adapted to be received within the concave side edge of one of the inside plates, the spring being selected of sufficient strength to retain the plates against advance by gravity.

Means are provided for effecting step-by-step advance of the column of inside plates in timed relation with the operation of the machine. This mechanism comprises a cam 207 driven by the shaft 80 and adapted to engage the roller 208 of a bell crank 209 pivoted to the shaft 83 at the same side of the machine as the shaft 80. The bell crank 209 has an arm 210 connected by a spring loaded collapsible link 211 with a lever 212 pivoted as indicated at 213, to a support 214. Vertically movable in a guide way indicated at 215 is a slide 216, the upper end of which is connected to the lever 212 by a pivot link 217. Carried by the support 214 are a pair of fixed abutments 218 and 219 and on the slide is provided a feeding finger 220 pivoted intermediate its ends, as indicated at 221. Over-center means are provided for positioning the finger 220 in either the full line position or the dotted line position illustrated in Figure 22. This means comprises a pin 223 (Figure 24) mounted on a block 224 on a pivot pin 225 and carrying a compression spring 226 which is adapted to engage the head 227 of the pin 223. The head 227 engages a transverse pivot pin 228 which extends through one end of the finger 220. The pin 223 is slidable in the block 224 and the arrangement is such that the device constitutes an over-center mechanism as aforesaid.

With the parts in the full line position illustrated in Figure 22, the feeding finger engages one of the inside plates 12. Succeeding downward movement of the slide will move the plate downwardly and adjustment of the stops 218 and 219 is selected so as to cause a downward movement of the plate a distance equal to the length of the plate. As the plate approaches the downward limit of its motion, the inner end of the finger 220 engages the stops 219 and shifts the finger to a position corresponding to the dotted line position out of engagement with the plates 12.

The foremost one of the series of plates in the guide way is thus brought into position over a recess 229 and its movement into position in alignment with the rollers carried in the carrier blocks at this station is effected by downward movement of the plunger 230 which is actuated from a cam 231 through a bell crank 232, a spring loaded collapsible link 233, a lever 234, and a pivot link 235, connecting the lever 234 to the upper end of the vertical slide or plunger 230.

Referring now to Figure 25 the link 12 is shown in position in the recess 229. From this figure it will be observed that the recess is closed at one end by a spring pressed plunger 236, the spring being indicated at 237, received in a guide way 238 and permitted limited longitudinal movement therein by a stop pin 239 projecting into a short recess 240. The end of the plunger 236 and the opposite wall of the recess 229 are both tapered as indicated at 241 and the arrangement is such that the spring pressure of the plunger 236 will thus hold the inside plate 12 upright and prevent it from falling over, as it would tend to do due to the projecting collars 11.

Means are provided thereafter for moving the plate 12 transversely into engagement with the rollers 13. This means comprises a plunger or slide 242 adapted to engage the flat outside surface of the inner plate 12 and to move it to the left as seen in Figure 22, into engagement with the rollers 13 which are already positioned. Means for actuating the slide 242 comprises a bell crank 243 mounted on the shaft 83 at the same side of the machine as the timing shaft 54, which is actuated by a second cam 244 driven by the shaft 54. The cam 244 is provided with a dwell so that after the plate 12 has been moved into position with its collar 11 extending into the open ends of the rollers 13, the plunger will remain in position until the carrier block has advanced the assembly away from station #2 and into a portion of the channel 170, which will engage the flat outside surface of the inner plate 12 and prevent the part from becoming disassembled with respect to the rollers 13.

Associated with the lever 234 is a second lever 248 having an adjustable bolt 250 thereon, which is adapted to engage the actuator of the microswitch MS2, in the event that the plunger 230 is allowed to move too far downwardly, as will occur if no plate is in position beneath the plunger to be inserted in the chain. The mechanism is therefore responsive to failure in the supply of inside plates and the microswitch is connected to a circuit so as to interrupt the operation if the supply of plates fails. A similar microswitch MS3 (not illustrated) is provided at station #3.

*Station #4*

Referring now to Figures 26–29 there is illustrated the mechanism for inserting the pins into the chain assembly.

A supply of pins is contained in an elevated supply hopper and feeds downwardly through the tubular members 260 into vertically disposed passages 261 located in the block 262. Means are provided for engaging the lowermost of the pins in each of the passages and for tipping the pins onto a movable carrier into alignment with the openings in the collars 11 of the inside plates 12. At the same time, means engage the pins directly above the ones to be inserted and prevent downward movement by gravity of the pins until the mechanism has cleared.

This mechanism is best illustrated in Figures 27 and 28. Referring now to Figure 28, carrier blocks 25 are illustrated in position to support the elements of the chain previously assembled for reception of the pins. A main slide 264 is provided in suitable ways indicated at 265. The lower portion of the slide 264 carries an extension 266 having a pair of notches 268 into which the lower ends of the pins 10 extend. Rearwardly from the notches, the upper surfaces of the extension 266 are provided with grooves 270 into which the pins 10 are tipped when the slide 264 is advanced. Rearwardly from the extension 266 the slide 264 is of increased height and extending through a portion of the slide in alignment with the grooves or recesses 270 are cylindrical passages 272 which receive rod members 274 connected at their outer end to an auxiliary slide 276. The auxiliary slide 276 is relatively movable to the left with respect to the main slide 264 from the position illustrated in Figure 27, clearance for this movement being provided as indicated at 275. The lower portion of the block 262 has an opening 278 therein shaped to receive the extension 266 of the main slide 264. The height of the opening is somewhat less than the length of the pins 10 so that the lowermost pin 10 rests upon a plate 280 while its upper end is restrained from movement to the left by a portion of the block 262 above the opening 278.

As the main slide 264 moves to the left as seen in Figure 28, the lower portion of the extension 266 moves the bottom of the pins to the left. Since the top of the pins at this time is restrained against movement to the left by engagement with the portion of the block 262 above the opening 278, the pins are rocked in a clockwise direction and are caused to lay within the grooves or channels 270 provided in the upper surface of the forward extension 266. The opening 278 is dimensioned so that as the projecting portion 266 moves thereinto the pins are accurately guided in the grooves or recesses 270 which are in accurate alignment with the openings in the collars of the inside plates 12. The auxiliary slide 276 follows the main slide 264 and advances the rods 272 into engagement with the ends of the pins and presses the pins into the chain assembly.

In order to prevent downward movement of the column of pins, the main slide 264 includes an independent slide 284 carrying members 286 adapted to engage the pins directly above the pins being inserted. The slide 284 is biased to the left as seen in Figure 27, by a compression spring 287 so that as the main slide 264 moves to the left, the slide 284 remains stationary and applies pressure to the pin directly ahead thereof.

Means for actuating the mechanism comprises a pair of cams 290 and 292, which actuate bell crank levers 294 and 296 respectively, which are connected to the auxiliary slide and the main slide. The cams are of course designed and positioned so as to effect actuation of the parts in properly timed relation as described above.

Mounted on the frame 20 is a microswitch MS4 which is adapted to be engaged by one or the other actuators 298, each of which is carried by one of the two independent slides 284. If no pin is in either of the passages 261 to be engaged by the member 286, the corresponding actuator 298 will operate the microswitch MS4 to terminate operation of the machine. This mechanism is therefore sensitive to a supply of pins in the vertical feed passages and will interrupt the operation of the machine if the supply of pins becomes exhausted.

Adjacent this station there is also provided a locator 300 including a plunger 302 adapted to enter into a transverse passage in the carrier block 25, adjacent to the blocks carrying the chain parts into which the pins 10 are being inserted. This mechanism is in all respects identical to the similar mechanism described in conjunction with station #1 and illustrated in Figure 19. It may be mentioned at this time that similar carrier block locators may be provided wherever found to be desirable throughout the length of the machine.

*Stations #5 and #6*

The mechanism for assembling the outside plates onto the chain structure is illustrated in Figures 30–36.

The mechanism for applying the outside plates to the opposite sides of the chain are substantially identical except for reversal of parts, and accordingly, only the mechanism for applying one of these outside plates will be illustrated in detail.

A supply of outside plates is provided in an elevated position in a hopper through which a series of plates are led downwardly through a suitable guide to a retaining channel 320 in the block 321. The outside plates 14 are moved downwardly in step-by-step manner by a positive feed mechanism comprising a dog 323 pivoted as indicated at 324 to a vertical slide 325 mounted in suitable ways indicated at 326 in the block 327. The dog 323 is provided with a spring actuated over-central mechanism which comprises a pin 328 carrying a compression spring 329, and mounted on a pivot pin 330. The opposite end of the pin 328 is pivotally connected through the medium of another pin 332 to one end of the dog 323. The dog has a finger portion 333 adapted to enter into one of the openings through the outside plates so as to engage the plates and to advance the series of plates as the dog is moved by movement of the slide 325. Carried by the supporting structure are a pair of adjustable abutments 334 and 336 which are adapted to engage the end of the dog remote from its actuating finger and to cause it to move to one or the other of its two limiting positions.

The mechanism for effecting timed vertical reciprocation of the slide 325 comprises a lever 337 connected by a spring pressed collapsible link 338 to a bell crank actuated by a cam 339 carried by the timing shaft 80.

With the dog in the position illustrated in Figure 31, downward movement of the slide will move the series of plates 14 downwardly a distance equal to the length of one plate. If desired, resilient means may be provided opposing the advance of the plates below the dog 323, which may be similar to corresponding mechanism illustrated in conjunction with station #2 and particularly illustrated at 205 in Figure 21. Plates 14 are advanced into vertical alignment and beneath a guide passage 340 in which a vertically movable plunger 342 is provided. The plunger 342 is actuated through the medium of a bell crank 344 pivoted on a shaft 345 and actuated by a spring biased collapsible link 346 actuated by the crank arm 348 of a bell crank pivoted to the shaft 83 and actuated from a cam follower 350 carried by the other crank 352 of the bell crank. This mechanism engages a plate 14 and moves it downwardly into alignment with a plunger 356 which is actuated by a bell crank 358, also mounted on the shaft 83 and operated by a cam 360 on the timing shaft 54. The plate 14 which is moved downwardly into alignment with the chain being assembled by the plunger 342, enters into an enlarged opening indicated at 364 which is best seen in Figure 33. The opening 364 is closed at one side by a spring pressed block 366 having limited back and forth movement as determined by a pin 368 extending into a slot 370 formed at the side of the block. The opposite walls of the opening 364 are tapered as indicated at 371 and 372, the arrangement being such that a plate 14 is engaged at its end by the inclined surfaces and is held thereby in vertical position. Subsequent actuation of the plunger 356 moves the plate in a direction perpendicular to its flat surface through the space 364 into engagement with the pins 10 which are located at the opposite side of the opening.

In order to insure proper alignment of the pins 10 with the plates 14 as the plates are advanced into position, locating mechanism is provided for insuring exact registration of the carrier blocks at the station. This mechanism comprises a slide 380 carrying a locating pin 382 adapted to enter in a correspondingly shaped through opening in one of the carrier blocks 25. The slide 380 is actuated by a crank 384 of a bell crank pivoted to the shaft 83 at the same side of the machine as the timing shaft 80. The other crank 386 of the bell crank is connected to an arm 388 of an eccentric 390 driven from the shaft 80.

In order to provide for quick removal and replacement of the locating pins 382, the mechanism best illustrated in Figures 34 and 35 is provided. Located at the forward end of the slide 380 is a block 394 having a slot 396 therein in which is pivoted a latch plate 398, the pivot being provided by a pin 400. To the rear of the slot 396 the portion of the block 394 indicated at 402 is provided with an enlarged opening 404 of a size sufficient to pass the head 405 of the pin 382. The portion 406 of the block 394 to the right of the slot 396, is provided with a smaller opening of a size sufficient to pass the main body portion of the pin 382. The large plate 398 is cut away as indicated at 407 to provide a space for the reception of the head of the pin. In order to remove the pin it is necessary only to swing the plate 398 upwardly about the pivot axis established by the pin 400 and to withdraw the pin 382 through the enlarged opening 404 in the portion 402 of the block.

Referring again to Figure 33 it will be observed that the channel 170 in the vicinity of station #5 is shaped so as to cause the pins 10 to project toward the side of the chain assembly from which the outside plates 14 are advanced. As the series of carrier blocks 25 moves away from station #5, the wall of the channel 170 is inclined as indicated at 410 to cam the pins 10 inwardly with respect to the chain so that they project from the opposite side of the chain, one of such pins being indicated at 10a. This is for the purpose of providing protruding pin portions at the opposite side of the chain assembly for receiving the outside plate which is advanced into association therewith at station #6.

Referring now to Figure 36, means are provided for sensing the presence of outside plates in the passage 320 and this means comprises a support 420 rigidly secured to the block 320 and carrying thereon a microswitch MS5. A bell crank 422 is provided which is connected by a link 423 to a suitable lever mechanism actuated by a cam on the shaft 54. Slidably mounted in a suitable recess in the support 420 is a plunger 425 having a feeler 426 adapted to engage the second outside plate above the feed dog 323 when in upper position as indicated in this figure. The plunger 425 has a reduced portion 428 surrounded by a compression spring 429 located within a chamber in the support 420 and adapted to engage the enlarged head 430 of the plunger so as to bias the plunger to the left as seen in this figure. At its outer end the plunger is bolted as indicated at 432, to a plate 434 carrying a switch actuator 436. The plate 434 also carries an adjustable bolt 438 adapted to engage a cylindrical block 440 extending from the crank 442 of the belt crank 422. When the device operates to determine the presence of an outside plate 14, the bell crank 422 rotates in a counterclockwise direction, and compression spring 429 forces the plunger 425 to the left until the feeler 426 engages the plate 14. When the feeler 426 engages the plate 14 the switch actuator 436 will be spaced from the microswitch MS5. If however, no plate is present to engage the feeler 426, the plunger 425 will continue its motion to the left as permitted by similar movement of the cylindrical block 440 until switch actuator 436 actuates the microswitch MS5 to shut down the machine. A similar microswitch MS6 (not illustrated) is provided at station #6.

*Station #7*

In order that the operation of the machine shall be fully automatic, it is necessary to provide means for predetermining the length of each individual chain and to separate the chain into sections of such predetermined length. Mechanism for accomplishing this result is illustrated in Figures 37–39.

As best seen in Figure 37, a pair of knock-out plungers 450 are provided having reduced forwardly extending portions 452 shaped to enter into the pin receiving openings in the chain so as to eject the pins 10 therefrom. The plungers 450 are provided with heads 454 suitably received within slots 456 provided on a slide 458. The slide is mounted in a guide passage 460 closed by a cover plate 462 having a slot 464 therein. Pivoted to the plate 462 is a latch dog 466 having a finger 468 shaped to enter a notch or recess 470 provided in the upper surface of the slide 458. Depending from the slide 458 into an elongated recess provided in a block 472, is a pin 474 adapted to be engaged by a compression spring 476 which biases the slide 458 to the right as seen in Figure 37. The slide is retained against motion by the finger 468. The free end of the dog 466 is connected by a link 478 to the plunger of a solenoid 480.

Means are provided for energizing the solenoid 480 after a predetermined number of links have been assembled and this means comprises counting mechanism indicated generally at 482 which includes a movable member 484 actuated once upon each revolution of a cam 486 secured to the timing shaft 80. Pivoted to the shaft 83 at the side of the machine at which the shaft 80 is located, is a bell crank lever 490 having one crank 492 carrying a roller 494 engageable with a cam 496. The other crank 498 of the lever 490 is connected by a link 500 to a reset lever 502 of the timing mechanism.

A second lever 505 is connected to the bell crank 490 for movement therewith, and is connected to the slide 458 by a link 507.

The timing mechanism is set to determine the desired number of links in a chain. Thereafter, as the chain advances past station #7, the lever 490 is retained against movement and the roller 494 is retained out of engagement with the low part of the cam 496 by the operation of the finger 468. However, after the counter has counted a predetermined number of links, a circuit is completed to the solenoid 480 and the core is drawn upwardly, thus releasing the finger 468 from the notch 470. Accordingly, during the succeeding revolution of the cam 496 the roller 494 follows the contour of the cam and the slide 458 makes a single reciprocation to the right and then to the left as seen in Figure 37. This motion causes the reduced portions 452 of the plungers to pass through the chain, pushing the pins 10 out of the chain and releasing the outside plates 14. As the slide reaches the position illustrated in Figure 37 after such reciprocation, it is engaged by the finger 468 and is retained in this position until a succeeding length of chain has been assembled.

As the roller 494 follows the cam 496 during its single revolution, the crank 498 makes one oscillation moving the reset lever 502 to reset the counting mechanism to zero.

Stations #8 and #9

Mechanism is provided for staking or riveting the heads of the pins 10 as the final operation of the assembly in the machine, and the mechanism for this purpose is illustrated in Figures 40–44.

Referring now to Figure 41, this mechanism comprises a slide 510 guidably mounted in a block 512 secured to the frame 20. At the forward end of the slide 512 there are removably carried a pair of staking or riveting punches 514 which are positioned to engage the ends of the pins 10 located in the chain assembly at this point. Directly opposite the location of the punches 514 is a hardened block or anvil 516 against which the opposite ends of the pins engage. At this station a clip 518 is provided engaging the top of the chain assembly.

The mechanism for operating the plungers 514 so as to stake or rivet the heads of the pins, comprises a flywheel 520 carried by the shaft 86 which in turn is driven from the timing shaft 80 by means of a drive chain 524 interconnecting sprockets 526 and 88 carried by shafts 80 and 86 respectively.

An adjustable sprocket 530 is provided for tightening the chain. Keyed or otherwise secured to an intermediate portion of the shaft 86 is an eccentric 534 which is received in a driving head 536. The driving head 536 is connected by an adjusting member 540 to a link 542 pivotally secured as indicated at 544 to the slide 510. A flywheel is provided so that a relatively great force may be available to drive the punches against the ends of the pins without at the same time requiring a disproportionate powerful motor.

As best seen in Figure 40, a block locator mechanism 550 is provided of the type previously described, which includes a slide 552 and a locating pin 554 carried thereby adapted to pass through a transverse opening in one of the carrier blocks 25, so as to insure proper registration of the carrier blocks located adjacent the punches 514. The slide 552 is operated by suitable levers and links from a cam carried by the cam shaft 54 (not shown in this figure).

Mechanism is provided for insuring that the carrier blocks are in properly indexed position adjacent this station, and this mechanism, illustrated in Figures 43 and 44, comprises a support 560 carried by the frame 20 on which is mounted a slide 562. Secured to the rear end of the slide 562 is a block 564 carrying a cam engaging roller 566, and provided with a recess 568 for receiving a compression spring 570. A spring centering pin 572 extends rearwardly from the support 560. Adjacent its forward end the slide 562 is slotted as indicated at 574 and receives a slidable switch actuating block 576 which is keyed or otherwise secured to a feeler rod 578. The feeler rod 578 extends through a guide opening 580 provided in the rail member 582 and at its rear end projects through the block 576 into the recess 574. A compression spring 577 is located in the recess centered around the projecting portion of the rod 578 and urges the forward end of the block 576 against a stop pin 586 which extends transversely of the recess. Adjustably mounted on the top of the slide 562 is a plate 588 carrying a microswitch MS7. The shaft 86 is provided with a cam 590 which engages the roller 566 and reciprocates the slide back and forth as the shaft rotates.

The forward end of the feeler rod 578 is reduced as indicated at 594 and is shaped to pass freely through a transverse opening in a carrier block if the carrier blocks are in properly indexed position or are so close to indexed position that they may be moved into exact indexed position by operation of the locating pins 554. If however, the carrier blocks are out of registry more than an amount which may thus be corrected, the end of the feeler rod will engage the side of the block and forward motion of the slide 562 will result in moving the microswitch MS7 forwardly into engagement with the actuator block 576. The microswitch MS7 is of course connected into the control circuit so as to de-energize the main drive motor and to apply the brake to stop operation of the machine instantaneously.

Circuits and controls

A wiring diagram for the system is illustrated in Figure 45. In this figure the motor 40 is illustrated as connected to a conventional three phase system by a solenoid actuated switch 600. The control circuit for actuating the switch 600 and for conjointly actuating the brake solenoid 104 is a conventional 110 volt circuit comprising a first line 602 leading to a contact 604 of a safety switch indicated generally at 606 which is normally closed through contact 608 to the winding 610 of a switch 612, and thence through the starting switch 614 to the other side of the line in series with all of the microswitches MS1 to MS7 inclusive. The safety switch 606 is in position to have its contact 608 elevated when the brake solenoid is energized through the medium of a striker 616 engageable with a button 618 on the switch. This prevents energization of the motor 40 when the brake is applied. Assuming that the brake is de-energized so that the safety switch 606 is closed, closure of the starting switch 614 energizes the winding 610 of the switch 612 and moves the movable contact 620 of the switch 612 into engagement with the lower contact 622. This completes a circuit from the return line 624 of the control circuit through the switch 612, thence through the winding 624 of the switch 600 to the other side of the control circuit. This results in closure of the starting switch 600 and energization of the motor 40. In the event of failure of any of the microswitches MS1–MS7 the circuit through the winding 610 of the switch 612 is broken and the movable contact 620 is moved upwardly by a spring 626 into engagement with the upper contact 627. This completes a circuit from the line 624 through the solenoid to the other side of the control circuit.

Preferably, each of the microswitches MS1 to MS7 includes a series of signal lights indicated at 630 which will be energized when the movable element of the microswitch is depressed into contact with the lower contact illustrated in the figures.

While the mechanism has been described in detail in connection with each of the several operating stations, it may be observed that the specific mechanism may be somewhat differently designed. Thus, for example, the locating plungers, a few of which have been described, may be provided in greater or less number as circumstances and experience dictate. In general, the arrangement is such that the carrier blocks 25 are advanced in a step-by-step manner into approximately correct indexed position at each of the several stations, and if required are thereafter moved slightly to accurately indexed position and are held firmly in such position during the operation taking place at the particular station.

It may further be mentioned that the longitudinally extending channel 170 in which the several elements of the roller chain are assembled by the automatic mechanism, may if desired be open at its top or it may be provided with removable covers.

The mechanism illustrated and described in detail is not only fully automatic but is provided with safety means for terminating operation of the machine abruptly in the event of failure of several sorts. Thus, not only will the machine cease to operate when the supply of any particular chain element becomes exhausted, but it will cease to operate in the event that the carrier blocks fail to reach proper index position.

Preferably, the microswitches which terminate operation of the machine, are connected to signal lights so that in the event of automatic stoppage of the machine due to actuation of any particular microswitch, the signal light will indicate the cause of the stoppage so that it may be corrected.

One of the features of the present invention which contributes to its successful operation is the accuracy which is obtainable by forming each of the carrier blocks 25 as a gauge block. These blocks are advanced by pushing from the rear along the track way so that all of the blocks are in direct end to end engagement with the adjacent block. Accordingly, the block may be very accurately spaced and positioned in substantially exact registry with the several operating stations as the chain is intermittently advanced.

Another feature of the machine which contributes to its great utility is the high speed operation which is rendered possible by the design. Thus for example, the mechanism for advancing the side plates into position is constructed and arranged such that one of the plates is advanced into assembly with the chain while at the same time the remaining plates are advanced so as to position the leading plate in position directly above the chamber across which it is transferred into the chain assembly. The speed of assembly at these stations is therefore dependent only upon the speed with which the transfer plungers traverse the chamber since upon return of the transfer plunger the succeeding plate is in position to be forced downwardly ahead of the plunger before its succeeding stroke.

It will be readily apparent that each of the stations is specifically designed so that the assembly operation carried out thereat may be completed in the minimum time. In practice it is found that the mechanism operates in a fully satisfactory manner at speeds which are limited only by the rate at which the chain elements may be advanced through the delivery chutes.

The present machine is designed to accommodate different sizes of chains, and to change from one size of chain to another is a simple matter of substituting a different size of carrier blocks and substituting different operating elements designed for use with only one size of chain.

The drawings and the foregoing specification constitute a description of the improved machine to assemble chain structures in such full, clear, concise and exact terms as to enable any person skilled in the art to practice the invention, the scope of which is indicated by the appended claims.

What I claim as my invention is:

1. Automatic means for assembling a roller chain comprising a continuous support movable intermittently between a plurality of assembly stations, means at such stations for assembling the elements of the chain, said elements including transverse pins, counter mechanism, and means actuated thereby for removing a pair of pins at predetermined intervals to separate the assembled chain into predetermined lengths.

2. Automatic means for assembling a roller chain comprising a continuous support movable intermittently between a plurality of assembly stations, means at such stations for assembling the elements of the chain, said elements including transverse pins, counter mechanism, and plunger means actuated thereby for removing a pair of pins at predetermined intervals to separate the assembled chain into predetermined lengths.

3. Automatic means for assembling a roller chain comprising a continuous support movable intermittently between a plurality of assembly and operating stations, means at said assembly stations for assembling the elements of the chain, said elements including transverse pins, counter mechanism, means at a first operating station actuated by said counter mechanism for removing a pair of pins at predetermined intervals to separate the assembled chain into predetermined lengths, and means at a second operating station operable thereafter to stake or upset the ends of the remaining pins to complete chains of said predetermined length.

4. Apparatus for continuously assembling and completing roller chains in predetermined lengths, comprising an endless carrier, means for advancing said carrier, a plurality of assembly stations along said carrier at which chain elements are assembled, one of said stations comprising apparatus for inserting a cross pin to interconnect adjacent links, a subsequent station comprising means for removing a pin, counter mechanism effective to actuate said means only after a predetermined number of pins have passed said subsequent station, and final station means for broadening the ends of all pins remaining in the chain assembly.

5. Apparatus for continuously assembling and completing roller chains in predetermined lengths, comprising an endless carrier, means for advancing said carrier, means spaced along said carrier for assembling chain elements on said carrier, including means for inserting transverse pins to interconnect every adjacent link, means adjacent said carrier for removing pins subsequent to insertion, means for actuating said last means only after a predetermined number of pins have passed said last means, and means adjacent said carrier for broadening the ends of such pins as remain in assembly while the assembled chain structure remains on said carrier.

6. Apparatus for continuously assembling and completing roller chains in predetermined lengths, comprising an endless carrier, means for advancing said carrier intermittently, means adjacent said carrier for assembling chain elements on said carrier, said elements including cross pins connecting adjacent side plates, said means being operable during periods when said carrier is at rest, means adjacent said carrier, said last mentioned means being operable periodically to remove pins while said carrier is at rest, and punch means movable transversely of said carrier to lock pins in position while said carrier is at rest.

7. Apparatus as defined in claim 6 comprising a crank device for actuating said punch means, and common drive means for said means for advancing said carrier intermittently and said crank device.

References Cited in the file of this patent

UNITED STATES PATENTS

| | | |
|---|---|---|
| 507,263 | Egge | Oct. 24, 1893 |
| 1,068,075 | Pine | July 22, 1913 |
| 1,139,884 | Mellen | May 18, 1915 |
| 1,256,898 | Hayward | Feb. 19, 1918 |
| 1,256,944 | Spencer et al. | Feb. 19, 1918 |
| 1,505,691 | Barkstrom | Aug. 19, 1924 |
| 1,835,111 | Dow | Dec. 8, 1931 |
| 2,146,615 | Bishop | Feb. 7, 1939 |
| 2,157,289 | Hall | May 9, 1939 |
| 2,297,296 | Flintjer | Sept. 29, 1942 |
| 2,392,251 | Matthews | Jan. 1, 1946 |

FOREIGN PATENTS

| | | |
|---|---|---|
| 452,502 | Germany | July 22, 1926 |
| 331,093 | Great Britain | June 26, 1930 |